No. 683,347. Patented Sept. 24, 1901.
P. F. SMITH.
FRUIT SQUEEZER.
(Application filed Feb. 20, 1901.)
(No Model.)
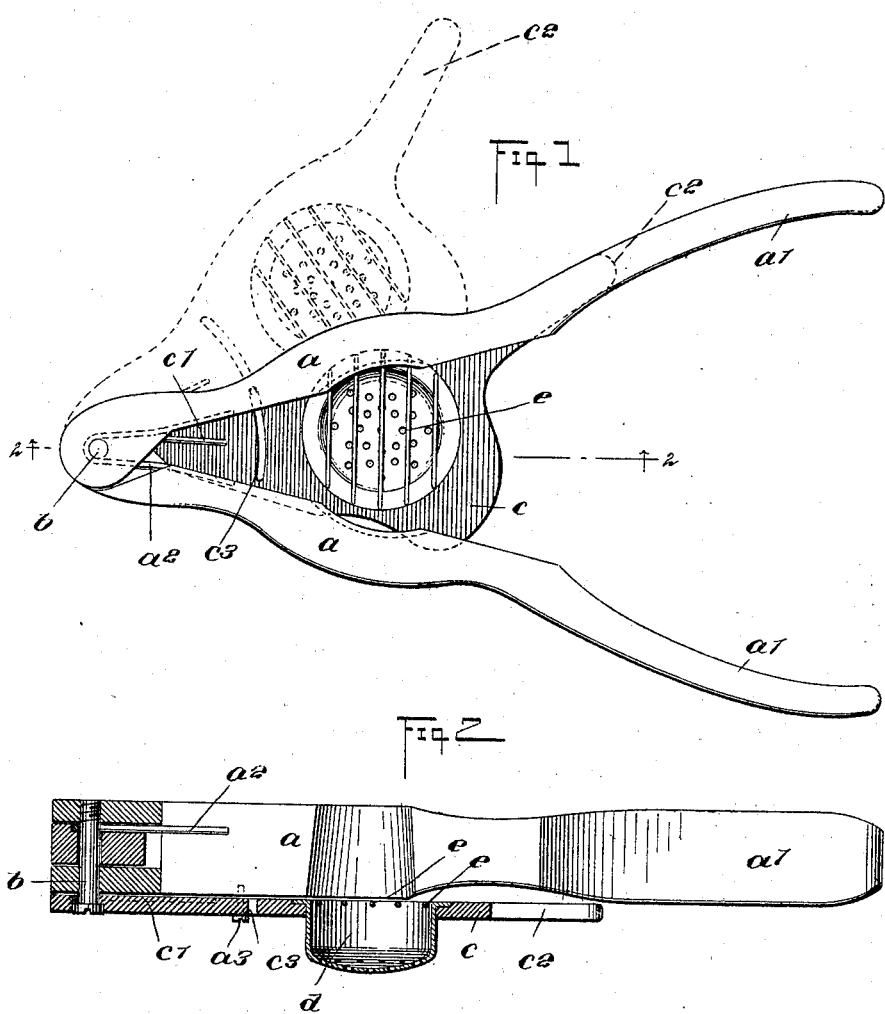
WITNESSES:
INVENTOR
Paul F. Smith
BY
ATTORNEYS

UNITED STATES PATENT OFFICE.

PAUL F. SMITH, OF DENVER, COLORADO.

FRUIT-SQUEEZER.

SPECIFICATION forming part of Letters Patent No. 683,347, dated September 24, 1901.

Application filed February 20, 1901. Serial No. 48,107. (No model.)

*To all whom it may concern:*

Be it known that I, PAUL F. SMITH, a citizen of the United States, and a resident of Denver, in the county of Arapahoe and State of Colorado, have invented a new and Improved Fruit-Squeezer, of which the following is a full, clear, and exact description.

This invention relates to a squeezer for limes, lemons, and other analogous fruit, by means of which device it is possible to effectively extract the juice and to separate the pits therefrom, so that the juice and pulp and the rind of the fruit may all be used, if desired, such parts having been completely separated from the pits by the operation of my device.

To this end the principal feature of my invention resides in a strainer serving to receive and contain the pits, which strainer is held by a member spring-actuated normally to lie sidewise from the squeezing devices.

The advantage of this construction is that immediately after the fruit has been squeezed the strainer may be released, whereupon it will be moved sidewise and the rind of the fruit may be conveniently dropped from the squeezing devices or jaws into any desired receptacle. I am therefore enabled to perform the work of squeezing limes and lemons much more effectively and expeditiously than with the instruments heretofore employed.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1 is a plan view of the invention, showing by dotted lines the normal position of the strainer; and Fig. 2 is a section on the line 2 2 of Fig. 1.

$a$ represents the two jaws of the device, between which the fruit is placed to squeeze it. These jaws are pivotally connected together by a pin $b$ and are provided at the opposite ends with handles $a'$. A spring $a^2$ is turned around the pin $b$ and bears, respectively, against the jaws $a$, the spring tending to hold the jaws normally spread apart, as shown in Fig. 1.

$c$ indicates a plate forming a carrier for the strainer $d$. This strainer is in the form of a cup having a perforate bottom, the cup being fastened in an orifice in the plate $c$ and projected below the same. Over the upper end or mouth of the strainer-cup $d$ is arranged a sort of grating $e$, formed of parallel bars or wires. These bars or wires, while not so shown, will in practice be slightly convexed upward. This grating is of a mesh sufficiently large to permit the pits of the fruit to pass through it, while the perforations in the strainer $d$ are not large enough to allow the pits to escape, but such perforations are, however, sufficient to permit the free passage of the juice through the strainer. The strainer-carrier $c$ is mounted to turn around the pin $b$, such pin being projected below the jaws $a$, so as to properly engage the carrier $c$, and a suitable spring $c'$ is turned around the pin $b$ and engaged with one of the jaws $a$ and with the carrier $c$, such spring acting to throw the carrier normally in the position shown by dotted lines in Fig. 1—that is to say, in such a position as will place the carrier $c$ clear of the space between the jaws $a$. The purpose of this will be fully explained hereinafter. The carrier is also capable of being moved inward against the spring $c'$, as shown by full lines in Fig. 1, and for facilitating this operation the carrier is provided with a finger-piece $c^2$, projecting outward approximately in parallelism with the adjacent jaw-handle $a'$. For guiding the swinging movement of the carrier $c$ the carrier is provided with a slot $c^3$, which receives a guide-pin $a^3$, fastened on one of the jaws $a$.

In using the invention, supposing that the jaws are spread apart, as shown in Fig. 1, and that the strainer is in the position shown by dotted lines in said view, the strainer-carrier is moved inward to the position shown by full lines in Fig. 1, so that the strainer will lie with its grating $e$ directly under the spreading jaws of the squeezer. With the carrier in this position the divided fruit is placed pulp down upon the grating. The jaws $a$ are now moved together to squeeze the fruit, care being taken to maintain the strainer in its proper position under the jaws, so that the juice from the fruit will pass through the grating and strainer into a receptacle below, and the pits or seeds will pass through the grating into the strainer and will be therein retained. When the fruit has been squeezed, the finger-piece $c^2$ of the strainer-carrier $c$ should be released, and the carrier will then move laterally back to the position shown by dotted lines in Fig. 1. Then by releasing the jaws $a$ the fruit will drop between these jaws into the receptacle below.

Having thus described my invention, I claim as new and desire to secure by Letters Patent—

1. A fruit-squeezer, comprising two pivotally-connected jaws serving to squeeze the fruit between them, a sieve, a carrier on which the sieve is mounted, the carrier being mounted to swing around the pivot of the jaws, and a spring pressing the carrier to throw it normally to one side of the jaws.

2. A fruit-squeezer, comprising squeezing devices, a movably-mounted sieve movable under the squeezing devices, and a spring pressing the sieve and holding it normally at one side of the squeezing devices, for the purpose specified.

3. A fruit-squeezer, comprising squeezing devices, a sieve, a carrier on which the sieve is mounted, the carrier being arranged to move into and out of proximity to the squeezing devices, and a spring actuating the carrier and holding the same normally out of proximity to the squeezing devices.

4. A fruit-squeezer, comprising squeezing devices, a swinging carrier, a spring engaging the carrier to hold it normally at one side of the squeezing devices, a cup-like sieve held by the carrier, and a grating extending over the mouth of the sieve.

In testimony whereof I have signed my name to this specification in the presence of two subscribing witnesses.

PAUL F. SMITH.

Witnesses:
ELLERY STOWELL,
EDWIN NETHERWOOD.